United States Patent [19]
Lidman

[11] Patent Number: 4,680,179
[45] Date of Patent: Jul. 14, 1987

[54] COCONUT FRUIT(S) FLAVORED BRANDY

[76] Inventor: Leonida L. M. Lidman, 12 Irwin Pl., Hazlet, N.J. 07730

[21] Appl. No.: 633,058

[22] Filed: Jul. 20, 1984

[51] Int. Cl.$^4$ .............................................. C12G 1/00
[52] U.S. Cl. ...................... 426/15; 426/494; 426/592
[58] Field of Search ............ 426/11, 12, 15, 494, 426/592, 493

[56] References Cited
FOREIGN PATENT DOCUMENTS

| 0588236 | 1/1978 | U.S.S.R. | 426/15 |
| 0863633 | 9/1981 | U.S.S.R. | 426/592 |

OTHER PUBLICATIONS

Amerine et al., Technology of Wine Making, 3rd Ed., 1972, pp. 600-608, 638, 639 and 640.

Primary Examiner—Raymond N. Jones
Assistant Examiner—Marianne M. Cintins
Attorney, Agent, or Firm—Charles I. Brodsky

[57] ABSTRACT

Process of improving the production of Coconut Brandy is disclosed which results in a smoother, mellower distilled spirit than brandy produced by current methods. Specifically, the instant process replaces sulphur with calamansi juice and jackfruit meat and coconut juice for boiled spring water, adds yeast, ferments, strains and distills this mixture, producing a clear, colorless, fruity improved coconut brandy.

8 Claims, No Drawings

COCONUT FRUIT(S) FLAVORED BRANDY

BACKGROUND

1. Field of Invention: Improvements in the Process of Producing Coconut Brandy

My invention improves the process of producing coconut brandy through the methods of fermenting, distilling and maserating/steeping a combination of coconut juice, prunes, apples, raisins, yeast, calamansi juice, honey and jackfruit meat, without adding sugar, water, artificial color, artificial flavor; resulting in a smoother, mellower, distilled spirit, without bitterness or burning after-taste and hangover of the present product.

Coconut brandy is presently produced in its pure form in little village stores in the Souther Tagalog Region of the Philippines. It can be produced in any country where coconut is grown.

The calamansi fruit[1], (the Tagalog term in Philippine National Language) for calamondin (the term in English), one of the ingredients I used to improve the process of producing coconut brandy, though presently grown in the Provinces of Batangas and Quezon in the Philippines, is presently grown and can be grown abundantly in the States of Hawaii and Florida and in Panama.

[1] The World Book Encyclopedia, Letter C, Vol. 3, p. 18, 1968

The Calamansi or calamondin is a small, loose-skinned orange. It has 7 to 10 segments and only a few small seeds. The deep orange flesh when ripe yields extremely acid juice.

The jackfruit[2], or fruit of the jack trees (jak, ja'ca) or artocarpus integrifolius, is an East Indian tree of the mulberry family, widely grown for its fruits of the same genus as breadfruit though jackfruit is larger and coarser.

[2] The World Book Dictionary, Vol. 1, 1968, Index P. 1049

The large, globular jackfruit weighs from 5 to 50 lbs. The edible fruit, covered with coarse prickly points is first green, then brown and when ripe, turns yellow; the smell is pleasant and the meat is sweet and succulent. The jack trees grow abundantly in the Philippines, India, Ceylon (Sri-Langka), Eastern Archipelago and Portugal.

There are 1200 calamansi trees and 917 jackfruit trees that are fully grown as cover crops on my family's coconut plantation in the Philippines consisting of 2,207,000 square meters, and more will be planted. Hence, the possibility of these trees becoming unavailable for my purpose is remote. When others realize the important commercial values of these two fruits, many landowners will cultivate, plant and grow them in abundance.

2. Description of the Prior Art

Steps in the production of coconut brandy:

1. Squeeze out toddy or sap from unopened coconut inflorescence (2–18 days old) by cutting a hole or by wounding the branch.

2. Allow toddy or sap to flow freely through a bamboo tube 4–5 long secured to the branch by wire or rope tied around it. 4–5 long bamboo pole contains 3–5 gallons of cloudy, thickly concentrated sap or toddy.

3. Add 1 gallon of boiled spring water and 1½ tbsp. of finely ground sulphur to 3 gallons of toddy or sap. Stir constantly for 2 hours until the sap thins out and the sulphur dissolves, producing frothy bubbles. Let stand two days or until the bubbles disappear.

4. Boil this mixture in a tightly covered container for 2–3 hours over a very low flame. While boiling, stir constantly with a long wooden stirrer inserted through the container top. Keep tightly sealed.

5. Trap the vapors produced through a pipe connected to a second tightly sealed container, and allow to condense there. A clear, greenish alcoholic beverage called the "lambanog" or coconut brandy will be the end product. This lambanog smells sulphuric or mediciny, taste bitterly burning and causes a strong "hangover".

3. The Process of Improving the Production of Coconut Brandy

My invention improves the process of producing coconut brandy, resulting in a smoother, mellower distilled spirit without bitterness or burning aftertaste and hangover of the present product.

Steps 1 and 2. Follow steps 1 and 2 of the prior art.

Step 3. Substitute calamansi juice and jackfruit meat for sulphur to clear the cloudiness of the coconut toddy.

Step 4. Substitute toddy or juice from young coconut (which are 5–18 days old as compared to ripe and mature coconuts which are 20–35 days old) for boiled spring water to thin or dissolve the thick sap/toddy from the unopened coconut inflorescense.

Step 5. Mix ingredients in Steps 3 and 4 thoroughly.

Step 6. Ferment the misture of coconut toddy from the unopened coconut inflorescence (3 gallons), juice from young coconut (1 gallon), thinly sliced jackfruit meat (3 lbs.), calamansi juice (½ cup), yeast (1½ tbsp.), include calamansi pulp before boiling or distilling.

Step 7. Allow the mixture in Step 6 to ferment for 7–10 days or until air bubbles disappear. Sieve this mixture thoroughly through a cotton cloth strainer as many times as necessary to separate the jackfruit meat, seeds and pulp of calamansi and any other sediments that may remain Step 8. Distill this strained mixture by boiling in a tightly covered vat or earthen jar at 172 degrees F. at least for about 3 hours. I use earthen jars or vats made from volcanic clay or loam colored pale-brown to reddish because this catches the taste of the brandy and of the fruits best of any available. These jars are readily available in the Philippines or in any country with similar soil and climate.

Step 9. While boiling, trap the vapors through a siphon of young hollow bamboo poles connecting the boiling vat to the trapping or condensing vat. These young hollow bamboo poles are naturally dewy. The deweniss cools the vapors as they pass through and aids their condensation into liquid.

Step 10. Allow the vapors to collect and to condense for 72 hours. The result will be a clear, colorless, fruity (aromatic) smelling distilled spirit—the improved coconut brandy.

The improved coconut brandy has no bitter, sulphuric, mediciny taste. This coconut brandy was improved by substituting coconut juice, calamansi juice and jackfruit for sulphur and boiled spring water.

However, this improved coconut brandy still has a burning taste and produces "hangover". To remove the burning taste and hangover, I follow the recipe/procedure below:

COCONUT FRUIT(S) FLAVORED BRANDY RECIPE

Ingredients 3 gallons of improved coconut brandy
9 lbs. sweet prunes
9 lbs. sweet dried raisins
3 dozen large, delicious apples
1½ yeast (Fleischmann)
2 quarts to ½ gallon of honey (depending on sweetness desired)
10 lbs. of thinly sliced jackfruit meat (3 lbs. were already used during the initial fermentation before distillation)
½ gallon apple cider/juice
3 dozen calamansi juice (1 dozen of which was already used during the initial fermentation before distillation)

Steps

Wash the prunes, raisins, apples and jackfruit meat.

Separate the meat of the prunes from the pits and crack open the pits to get the syrup inside.

Cut the delicious apples into thin, long slices for easy mixing and mashing. Be sure to include the skin. Throw away the cores.

Cut the 2 dozen calamansi fruits into halves (1 doz. already used in the fermentation of the coconut juice); press out juice into the container, include the pulp.

Mix the thin slices of apples, prunes and raisins with syrup from the prune pits, calamansi juice, and thin slices of jackfruit meat. Mix well in large, clean enamel pot or crock pot. A large wooden bowl would be perfect.

Add the apple cider/juice and mash the entire mixture thoroughly.

Dissolve the yeast in 1 cup lukewarm coconut juice (lukewarm water will do); add to mixture.

Add 2 quarts to ½ gallon of honey depending on desired sweetness.

Add the 3 gallons of improved coconut brandy.

Cover in earthen jar or vat and let stand to steep or maserate in warm location (65-75 degrees Fahrenheit) for 2-3 months to allow for full fermentation.

At the end of 2-3 months, strain as many times as necessary, through a sieve of cotton cloth or pleated paper filter or glass filter until the brandy is sharply clear.

Siphon off the clear brandy into a bottle and allow to age in a cellar or room at 65-75 degrees Fahrenheit for at least one (1) year.

After 1 year, the end product will be improved Coconut Fruit(s) Flavored Brandy with the sweet smell and very pleasant taste of mixed fruits, devoid of mediciny/sulphuric smell, burning/bitter taste, and "hangover effect" experienced with coconut brandy in its pure form.

What I claim is:

1. In the process of producing coconut brandy, according to the steps of (1) utilizing boiled spring water and finely ground sulphur to thin out the sap of unopened coconut inflorescence, (2) boiling the resulting sap mixture while stirring same, (3) trapping the vapor produced through said boiling and (4) condensing said vapor in a sealed container to produce the brandy product, wherein the improvement comprises at least one of:
    (a) substituting calamansi juice and jackfruit meat for said finely ground sulphur so as to improve the clarity of the coconut brandy produced; and
    (b) substituting the juice from 5-18 day old coconut for said boiled spring water so as to improve the consistency of the coconut brandy produced.

2. The improvement of claim 1 comprising both of said substitutions of (a) and (b) in the process of producing coconut brandy.

3. The improvement of claim 2, additionally including the step of fermenting together said calamansi juice, said jackfruit meat and said juice from 5-18 day old coconut prior to the boiling of the mixture in step 2 of said process.

4. The improvement of claim 3 wherein said fermenting step continues until substantially all air bubbles disappear.

5. The improvement of claim 3, further including the step of straining the fermented mixture of said calamansi juice, said jackfruit meat and said juice from 5-18 day old coconut.

6. The improvement of claim 5 wherein, the boiling of the mixture is carried out at temperatures at least as high as 172° F.

7. The improvement of claim 6 wherein the trapping of the vapors produced as a result of boiling is carried out through a syphon of hollow bamboo poles.

8. The improvement of claim 7 wherein the step of condensing the vapors trapped is carried out prior to the boiling of the mixture in step 2 of said process over a period of at least 72 hours.

* * * * *